US008845882B2

(12) United States Patent
Shu et al.

(10) Patent No.: US 8,845,882 B2
(45) Date of Patent: Sep. 30, 2014

(54) HIGH LIGHT OLEFINS FCC CATALYST COMPOSITIONS

(75) Inventors: Yuying Shu, Ellicott City, MD (US); Richard F. Wormsbecher, Dayton, MD (US); Wu-Cheng Cheng, Ellicott City, MD (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/578,384

(22) PCT Filed: Mar. 8, 2011

(86) PCT No.: PCT/US2011/027571
§ 371 (c)(1),
(2), (4) Date: Aug. 10, 2012

(87) PCT Pub. No.: WO2011/115785
PCT Pub. Date: Sep. 22, 2011

(65) Prior Publication Data
US 2013/0001134 A1    Jan. 3, 2013

Related U.S. Application Data

(60) Provisional application No. 61/315,317, filed on Mar. 18, 2010.

(51) Int. Cl.
*C10G 11/05* (2006.01)
*B01J 29/06* (2006.01)
*B01J 29/08* (2006.01)
*C10G 11/18* (2006.01)

(52) U.S. Cl.
CPC ............. *C10G 11/18* (2013.01); *C10G 2400/02* (2013.01); *B01J 29/088* (2013.01); *C10G 2400/20* (2013.01); *C10G 2300/70* (2013.01); *B01J 2229/18* (2013.01)
USPC ............ 208/120.01; 502/60; 502/65; 502/73; 502/79

(58) Field of Classification Search
CPC .......... B01J 27/14; B01J 29/08; B01J 29/088; B01J 29/061; B01J 29/085; B01J 2229/18; B01J 2229/186
USPC ....................... 502/60, 65, 73, 79; 208/120.01
See application file for complete search history.

(56) References Cited

U.S. PATENT DOCUMENTS

| | | | |
|---|---|---|---|
| 3,293,192 A | 12/1966 | Maher et al. | 252/430 |
| 3,338,672 A | 8/1967 | Haden | 23/112 |
| 3,367,886 A | 2/1968 | Haden at al | 252/455 |
| 3,436,357 A | 4/1969 | Plank et al. | 502/65 |
| 3,459,680 A | 8/1969 | Plan et al. | 502/65 |
| 3,515,511 A | 6/1970 | Flank et al. | 23/112 |
| 3,574,538 A | 4/1971 | McDaniel | 23/112 |
| 3,733,391 A | 5/1973 | Hoffman | 423/118 |
| 3,930,987 A | 1/1976 | Grand | 208/111 |
| 3,939,246 A | 2/1976 | Rollmann | 423/118 |
| 4,086,187 A | 4/1978 | Lim et al. | 252/455 |
| 4,166,099 A | 8/1979 | McDaniel | 423/329 |
| 4,206,085 A | 6/1980 | Lim et al. | 252/455 |
| 4,302,622 A | 11/1981 | Chu | 585/467 |
| 4,308,129 A | 12/1981 | Gladrow et al. | 208/120 |
| 4,343,723 A | 8/1982 | Rogers et al. | 252/455 |
| 4,374,294 A | 2/1983 | Chu | 585/466 |
| 4,399,059 A | 8/1983 | Chu | 502/73 |
| 4,405,443 A | 9/1983 | Bertolacini et al. | 208/113 |
| 4,450,443 A | 5/1984 | Dolland | |
| 4,493,902 A | 1/1985 | Brown et al. | 502/65 |
| 4,542,116 A | 9/1985 | Bertolacini et al. | 502/65 |
| 4,631,262 A | 12/1986 | Altomare | 502/65 |
| 4,664,780 A | 5/1987 | Lochow et al. | 208/120 |
| 4,764,269 A | 8/1988 | Edwards et al. | 208/120 |
| 4,793,827 A | 12/1988 | Lochow et al. | 44/65 |
| 4,965,233 A | 10/1990 | Speronello | 502/65 |
| 5,008,225 A | 4/1991 | Magistro et al. | 502/73 |
| 5,071,806 A | 12/1991 | Pecoraro | 502/68 |
| 5,082,815 A | 1/1992 | Macedo | 502/68 |
| 5,085,762 A | 2/1992 | Absil | 208/120 |
| 5,194,413 A | 3/1993 | Kumar | 502/65 |
| 5,227,352 A | 7/1993 | Tsujii et al. | 502/65 |

(Continued)

FOREIGN PATENT DOCUMENTS

CN    1064499 A    9/1992
CN    101143334 A    3/2008

(Continued)

OTHER PUBLICATIONS

American Chemical Society Symposium Series, Contaminant-Metal Deactivation and Metal-Dehydrogenation Effects During Cyclic Propylene Steaming of Fluid Catalytic Cracking Catalysts, No. 634, Chapter 12, pp. 171-183 (1996) by L.T. Boock, T.F. Petti, and J.A. Rudesill.

(Continued)

*Primary Examiner* — Elizabeth Wood
(74) *Attorney, Agent, or Firm* — Charles A. Cross

(57) ABSTRACT

Catalytic cracking catalyst compositions and processes for cracking hydrocarbons to maximize light olefins production are disclosed. Catalyst compositions comprise at least one zeolite having catalytic cracking activity under catalytic cracking conditions, preferably Y-type zeolite, which zeolite has low amounts of yttrium in specified ratios to rare earth metals exchanged on the zeolite. Catalyst and processes of the invention provide increased yields of light olefins and gasoline olefins during a FCC process as compared to conventional lanthanum containing Y-type zeolite FCC catalysts.

18 Claims, No Drawings

(56) References Cited

U.S. PATENT DOCUMENTS

| | | | |
|---|---|---|---|
| 5,258,341 A | 11/1993 | Chitnis et al. | 502/68 |
| 5,395,809 A | 3/1995 | Madon | 502/68 |
| 5,716,896 A | 2/1998 | Knifton et al. | 502/113 |
| 5,891,326 A | 4/1999 | Shi | 209/166 |
| 5,908,547 A | 6/1999 | Chitnis et al. | 208/120.01 |
| 5,997,728 A | 12/1999 | Adewuyi et al. | 208/120.01 |
| 6,030,916 A | 2/2000 | Choudary et al. | 502/65 |
| 6,069,012 A | 5/2000 | Kayser | 436/37 |
| 6,114,267 A | 9/2000 | Ghosh et al. | 502/68 |
| 6,635,169 B1 | 10/2003 | Bhore et al. | 208/120.2 |
| 6,656,347 B2 | 12/2003 | Stockwell et al. | 208/120.01 |
| 6,670,296 B2 | 12/2003 | Labarge et al. | 502/69 |
| 6,716,338 B2 | 4/2004 | Madon et al. | 208/120.01 |
| 6,906,232 B2 | 6/2005 | Levin | 585/638 |
| 7,015,175 B2 | 3/2006 | Vassilakis et al. | 502/217 |
| 7,033,487 B2 | 4/2006 | O'Connor et al. | 208/120.01 |
| 7,125,817 B2 | 10/2006 | Ou | 502/64 |
| 7,160,830 B2 | 1/2007 | Van Der Zon et al. | 502/8 |
| 7,208,446 B2 | 4/2007 | Stamires et al. | 502/355 |
| 7,319,178 B2 | 1/2008 | Levin et al. | 585/640 |
| 7,405,336 B2 | 7/2008 | Kelly et al. | 585/400 |
| 7,442,664 B2 | 10/2008 | Van De Zon | 502/63 |
| 7,641,787 B2 | 1/2010 | Yaluris et al. | 208/119 |
| 7,663,011 B2 | 2/2010 | Shan et al. | 585/533 |
| 7,863,212 B2 | 1/2011 | Wakui | 502/73 |
| 7,902,106 B2 | 3/2011 | Hu | 502/73 |
| 2008/0093263 A1* | 4/2008 | Cheng et al. | 208/114 |
| 2008/0156698 A1* | 7/2008 | Hu et al. | 208/120.05 |
| 2009/0215613 A1 | 8/2009 | Hagemeyer | 502/304 |
| 2010/0010279 A1* | 1/2010 | Kumar | 585/653 |
| 2013/0313164 A1* | 11/2013 | Shu et al. | 208/120.01 |

FOREIGN PATENT DOCUMENTS

| | | | |
|---|---|---|---|
| CN | 101455979 | 6/2009 | |
| EP | 0409332 | 1/1991 | |
| GB | 1483244 | 8/1977 | B01J 29/06 |
| WO | 92/01886 | 2/1992 | C30B 15/12 |
| WO | 94/15875 | 7/1994 | C01B 33/34 |

OTHER PUBLICATIONS

Breck, D.W., "Zeolite Molecular Sieves", Structural Chemistry & Use (1974) p. 94.

Sadeghbeigi, Fluid Catalytic Cracking Handbook, Gulf Publ. Co. Houston, 1995, ISBN 0-884 t5-290-1.

G. W. Young, G.D. Weatherbee, and S.W. Davey, "Simulating Commercial FCCU Yields With the Davison Circulating Riser (DCR) Pilot Plant Unit," National Petroleum Refiners Association (NPRA) Paper AM88-52.

G. W. Young, "Realistic Assessment of FCC Catalyst Performance in the Laboratory," in Fluid Catalytic Cracking: Science and Technology. J. S. Magee and M. M. Mitchell, Jr. Eds., Studies in Surface Science and Catalysis, vol. 76, p. 257, Elsevier Science Publishers B.V., Amsterdam 1993, ISBN 0-444-89037-8.

"Commercial Preparation and Characterization of FCC Catalysts", Fluid Catalytic Cracking: Science and Technology, Studies in Surface Science and Catalysis, vol. 76, p. 120 (1993).

Krishna, Sadeghbeigi, op cit & Scherzer, "Octane Enhancing Zeolitic FCC Catalysts", Marcel Dekker, New York, 1990, ISBN 0-8247-8399-9, pp. 165-178.

Venuto and Habib, Fluid Catalytic Cracking with Zeolite Catalysts, Marcel Dekker, New York 1979, ISBN 0-8247-6870-t.

Johnson, MFL., "Estimation of the Zeolite Content of a Catalyst from Nitrogen Adsorption Isotherms", Journal of Catalysis 52, pp. 425-431 (1978).

Morgado, Edisson et al. "Characterization of Peptized Boehmite Systems: An 27 Al Nuclear Magnetic Resonance Study," Journal of Colloid and Interface Science. 176 (1995): 432-441.

Brindley et al,, The Kaolinite-Mullite Reaction Series, Journal of the American Ceramic Society. vol. 42, No. 7 (1959) pp. 311 et al.

Duncan et al., Kinetics and Mechanism of High Temperature Reactions of Kaolinite Mine rats, Journal of the American Cermic Society, vol. 52, No. 2, (1969) pp. 74 et al.

* cited by examiner

HIGH LIGHT OLEFINS FCC CATALYST COMPOSITIONS

CROSS-REFERENCE TO RELATED APPLICATIONS

This application claims the benefit of U.S. Provisional patent application Ser. No. 61/315,317 filed Mar. 18, 2010, the disclosure of which is hereby incorporated herein by reference.

FIELD OF THE INVENTION

The present invention relates to the catalytic conversion of a feedstock to produce olefins. More specifically, the present invention relates to novel yttrium containing catalytic cracking catalyst compositions, the process of preparing the catalyst compositions, and the process of using the catalyst compositions to produce high light olefins yields during a catalytic cracking process.

BACKGROUND OF THE INVENTION

Catalytic cracking is a petroleum refining process that is applied commercially on a very large scale. A majority of the refinery petroleum products are produced using the fluid catalytic cracking (FCC) process. An FCC process typically involves the cracking of heavy hydrocarbon feedstocks to lighter products by contacting the feedstock in a cyclic catalyst recirculation cracking process with a circulating fluidizable catalytic cracking catalyst inventory consisting of particles having a mean particle size ranging from about 20 μm to about 150 μm, preferably from about 50 μm to about 100 μm.

The catalytic cracking occurs when relatively high molecular weight hydrocarbon feedstocks are converted into lighter products by reactions taking place at elevated temperature in the presence of a catalyst, with the majority of the conversion or cracking occurring in the vapor phase. The feedstock is converted into gasoline, distillate and other liquid cracked products as well as lighter gaseous cracked products of four or less carbon atoms per molecule. The gas partly consists of olefins and partly of saturated hydrocarbons. Bottoms and coke are also produced.

Generally, the product distribution obtainable from modern catalyst cracking units, in particularly, the fluid catalytic cracking (FCC) units, is acceptable. However, many refiners desire improved catalytic cracking methods or processes which increase the volume of light olefins products as well as the volume and octane number of gasoline products. It is also desirable to produce the lowest bottoms at a constant or decreased coke level.

FCC catalysts normally consist of a range of extremely small spherical particles. Commercial grades normally have average particle sizes ranging from about 20 μm to 150 μm, preferably from about 50 μm to about 100 μm. The cracking catalysts are comprised of a number of components, each of which is designed to enhance the overall performance of the catalyst. FCC catalysts are generally composed of catalytically active zeolite, active matrix, clay and binder with all of the components incorporated into a single particle. Alternatively, the catalysts are comprised of blends of the individual particles having different functions.

FCC catalysts containing rare earth exchanged zeolites are in wide commercial use and their general technical properties are widely known. See Fluid Catalytic Cracking with Zeolite Catalysts, Venuto and Habib, 1979 Marcel Dekker, In., pp. 30-46. Further, FCC catalysts comprising Y-type zeolite exchanged with rare earths have been disclosed in numerous patents including U.S. Pat. Nos. 3,436,357 and 3,930,987.

U.S. Pat. No. 4,405,443, discloses that zeolite exchanged with rare earth, then mixed with yttrium and an inorganic oxide provide an absorbent for sulfur oxides.

U.S. Pat. No. 4,793,827 discloses a hydrocarbon cracking catalyst which comprises rare earth exchanged Y-type zeolite which has been ion exchanged to enhance the yttrium content of the catalyst.

U.S. Pat. No. 5,908,547 discloses yttrium containing zeolite Y-type catalysts which are essentially free of rare earth ions.

SUMMARY OF THE INVENTION

Yttrium containing catalyst compositions have been discovered which provide high yields of light olefins as compared to conventional lanthanum containing catalytic cracking catalysts. In particularly, the catalytic cracking catalyst is a fluid catalytic cracking (FCC) catalyst. Catalyst compositions in accordance with the present invention are based on a zeolite catalytic component which has catalytic cracking activity under catalytic cracking conditions, preferably a Y-type zeolite, which has been exchanged with a combination of yttrium and at least one rare earth metal other than yttrium in a specified ratio. Advantageously, yttrium/rare-earth containing FCC catalysts of the invention provide increased yields of light $C_2$ to $C_4$ olefins during an FCC process as compared to the yields of light olefins obtainable using conventional lanthanum containing Y-type zeolite FCC catalysts. Unexpectedly, yttrium/rare earth containing catalyst compositions in accordance with the present invention provide increased gasoline olefins yields and bottoms conversion while simultaneously maximizing light olefins yields.

Accordingly, it is an advantage of the present invention to provide novel yttrium containing catalyst compositions which promote high yields of light olefins yields during a catalyst cracking process, in particular an FCC process.

It is also an advantage of the present invention to provide novel FCC catalyst compositions having specified combinations of yttrium and at least one rare earth metal, which compositions promote high yields of light olefins during an FCC process.

It is also an advantage of the present invention to provide yttrium and rare earth containing FCC catalyst compositions which promote increased gasoline olefins thereby providing gasoline products having an increased octane number during a catalyst cracking process.

Another advantage of the present invention is to provide high light olefins yttrium/rare earth containing FCC catalyst compositions which improve bottom conversions during an FCC process.

It is a further advantage of the present invention to provide low yttrium and rare earth containing FCC catalyst compositions in combination with ZSM-5 light olefins additives to promote increased light olefins and gasoline olefins production as compared to conventional lanthanum containing FCC catalyst in combination with ZSM-5 light olefins additives.

It is a further advantage of the present invention to provide a process for the preparation of yttrium/rare earth containing FCC catalysts in accordance with the present invention.

It is a further advantage of the present invention to provide a process for increasing the yields of light olefins produced during an FCC process using the yttrium/rare earth containing catalyst compositions of the present invention.

A further advantage of the present invention is to provide a process for increasing the yields of light olefins during an FCC process while simultaneously increasing the yields of gasoline olefins and bottoms conversion.

It is yet another advantage of the present invention to provide improved FCC processes using compositions and processes in accordance with the present invention.

These and other aspects of the present invention are described in further details below.

DETAILED DESCRIPTION OF THE INVENTION

The present invention encompasses the discovery that the exchange of a relatively small amount of yttrium in combination with a rare earth on a zeolite cracking component having catalytic cracking activity under catalytic cracking conditions, in particularly under fluid catalytic cracking (FCC) conditions, provide catalyst compositions having the ability to produce increased yields of light olefins during a FCC process. It has been found that yttrium in a specified ratio with rare earth exchanged on the catalytically cracking active zeolite acts synergistically to provide increased the yields of light olefins while maximizing the yield of gasoline olefins.

For purposes of the invention, the term "light olefins" is used herein to designate $C_2$ to $C_4$ olefins, e.g. ethylene, propylene and butylenes.

For purposes of the invention, the term "gasoline olefins" is used herein to designate $C_5$ to $C_{12}$ olefins which increase the octane number in gasoline products.

Yttrium is a metal commonly found in rare earth ores and has been occasionally referred to as a rare earth metal. Specifically, yttrium is not considered a rare earth metal itself Yttrium has an atomic number of 39 and therefore does not lie in the rare earth grouping on the elemental Periodic Table, which have atomic numbers from 57 to 71. The metals within this range of atomic numbers include lanthanum (atomic number 57) and lanthanide metals. See, *Hawley's Condensed Chemical Dictionary*, $11^{th}$ Edition, (1987). The term "rare earth" or "rare earth metal" is therefore used hereinafter to mean lanthanum, having an atomic number of 57 in the Periodic Table of Elements, lanthanide metals having an atomic number from 58 to 71 in the Periodic Table of Elements, their corresponding oxides, and combinations thereof. Typically, rare earth metals are metals selected from the group consisting of lanthanum, cerium, praseodymium, neodymium, promethium, samarium, europium, gadolinium, terbium, dysprosium, holmium, erbium, thulium, ytterbium, lutetium and combinations thereof The term "yttrium compound" is used herein to designate not only yttrium that is in the form a compound such as a yttrium salt, but also in the form of a yttrium cation such as that exchanged on zeolite. The term "yttrium compound" and the term "yttrium" are used interchangeably unless stated otherwise. Unless expressed otherwise herein, weight measurements of yttrium or an yttrium compound refer to that reported as yttrium oxide ($Y_2O_3$) in elemental analysis techniques conventionally used in the art, including but not limited to, inductively coupled plasma (ICP) analytical methods.

For purposes of the present invention, the term "yttrium/rare earth catalyst compositions" and "yttrium/rare earth catalyst" are used herein interchangeably to designate yttrium and rare earth containing catalyst compositions in accordance with the present invention.

The zeolite cracking component useful in the invention composition may be any zeolite which has catalytic cracking activity under catalytic cracking conditions, in particular, fluid catalytic cracking conditions. . The zeolite component includes a number of zeolites suitable for this purpose. Suitable zeolites include large pore crystalline alumino-silicate zeolites such as synthetic faujasite, i.e., type Y zeolite, type X zeolite, and Zeolite Beta, as well as heat treated (calcined) derivatives thereof. Preferably, the zeolite cracking component is a synthetic faujasite zeolite such as Y-type zeolite. Most preferably, the zeolite is an ultra stable type Y zeolite (USY) such as that disclosed in U.S. Pat. No. 3,293,192.

It is also within the scope of the invention that zeolite cracking component is a zeolite synthesized using clay, e.g. kaolinite or metakaolinite clay. For example, the zeolite may be one that is produced by treating clay with a silica source under alkaline conditions. Methods for making such zeolites are known and described in U.S. Pat. No. 3,459,680, the contents of which are incorporated by reference. Other methods for making zeolite from clay are also disclosed in U.S. Pat. Nos. 4,493,902 and 6,656,347, the contents of which are also incorporated herein by reference.

In accordance with the invention, the zeolite cracking component is partially exchanged with a combination of yttrium and at least one rare earth. Yttrium and rare earth may be exchanged on the zeolite, separately or simultaneously, using conventional means. In a preferred embodiment, yttrium is directly exchanged onto the zeolite prior to its addition of any optional components. This embodiment can be carried out in an aqueous exchange bath comprising soluble yttrium salt. Suitable water soluble salts include yttrium halides (e.g., chlorides, bromides, fluorides and iodides), nitrates, sulfates, carbonates and acetates. The water soluble salts of this embodiment are used in a concentration sufficient to provide the desired concentration of yttrium on the zeolite. The yttrium compound may consist essentially of yttrium, or in the alternative the yttrium compound may comprise yttrium and rare earth containing moieties. Additionally, rare earths may be exchanged separately on the zeolite in an aqueous exchange bath comprising a water soluble rare earth salt, e.g. halides (e.g., chlorides, bromides and iodides), nitrates, sulfates, and acetates.

The amount of yttrium exchanged on the zeolite cracking component is typically about 1.75 wt % to about 0.175 wt % of the zeolite. Preferably, the amount of yttrium exchanged on the zeolite ranges from about 1.50 wt % to about 0.20 wt %; most preferably, from about 1.40 wt % to about 0.30 wt % of the zeolite. Typically, the ratio of yttrium to rare earth exchanged on the zeolite is 3 to 50, preferably 3.5 to 20. As will be understood by one skilled in the arts, the amount of rare earth exchanged on the zeolite will vary depending upon the amount of yttrium exchanged on the zeolite and the desired ratio of yttrium to rare earth. For example, where the zeolite is exchanged with 1.75 wt % yttrium and the ratio of yttrium to rare earth ranges from 3 to 50, the amount of rare earth on the zeolite will range from about 0.583 wt % to about 0.035 wt %. Typically, however, the overall amount of yttrium and rare earth exchanged on the zeolite cracking component ranges from about 2.33 wt % or less, preferably from about 0.20 wt % to about 2.0 wt %.

The yttrium/rare earth exchanged zeolite cracking component may also be exchanged with a combination of metal and ammonium and/or acid ions. It is also contemplated that the zeolite component may comprise a mixture of zeolites such as synthetic faujasite in combination with mordenite and the ZSM type zeolites. Generally, the zeolite cracking component comprises from about 10 wt % to about 60 wt % of the cracking catalyst. Preferably the yttrium/rare exchanged zeolite cracking component comprises from about 20 wt % to about 50 wt %, most preferably from about 30 wt % to about 55 wt %, of the catalyst composition.

The invention catalyst may optionally include fillers such as clay. While kaolin is the preferred clay component, it is also contemplated that other clays, such as modified kaolin (e.g. metakaolin), may be optionally included in the invention catalyst. When used, the clay component will typically comprise from about 10 wt % to about 90 wt %, preferably about 20 wt % to about 80 wt %, and most preferably about 30 wt % to about 70 wt %, of the catalyst composition.

Optionally, catalyst compositions of the invention may also comprise at least one or more matrix materials. Suitable matrix materials optionally present in the catalyst of the invention include, but are not limited to, alumina, silica, silica-alumina and combinations thereof The matrix materials may be present in the invention catalyst in an amount ranging from about 10 wt % to about 90 wt %, preferably about 30 wt % to about 70 wt % of the catalyst composition It is also within the scope of the invention that the matrix material also contain binder. Suitable binders include, but are not limited to, silica sol, alumina sol, sodium silicate, peptized alumina and combinations thereof Typically, the binder is present in the amount of about 5 wt % to about 30 wt % of the catalyst composition.

It is further within the scope of the present invention that catalyst compositions of the invention may be used in combination with other additives conventionally used in catalytic cracking process, in particularly FCC processes, e.g. $SO_x$ reduction additives, $NO_x$ reduction additives, gasoline sulfur reduction additives, CO combustion promoters, additives for the production of light olefins, and the like.

In a preferred embodiment of the invention, the yttrium/rare earth containing catalyst of the invention is used in combination with a separate particulate ZSM-5 light olefins additive. Any conventional ZSM-5 containing light olefins additive typically used in an FCC process for light olefins production is useful in the present invention. Generally, the additives comprise particles having a size ranging from about 20 μm to about 150 μm, preferably from about 50 μm to about 100 μm, and comprising from about 10 wt % to 50 wt % ZSM-5. Optionally, the additives may further comprise matrix, binder and/or clay. Preferred ZSM-5 light olefins additives include, but are not limited to, OlefinsMax®, and OlefinsUltra®, manufactured and sold by Grace Davison, a division of W. R. Grace & Co.-Conn in Columbia, Md. Other ZSM-5 containing additives useful in the present invention for light olefins production include, but are not limited to, additives sold under the tradenames Z-CAT PLU®, ISO-CAT®, Z-CAT HP™, ZMX®, ZOOM®, PENTACAT™, PROPLYMAX™, ISOCAT HP™, SUPER Z™, PENTACAT HP™, PENTACAT PLUS™, OCTAMAX™, OCTAMAX HP™, K-1000™, K-2000™, BOOST™, IsoBOOST™, and MOA™. In a preferred embodiment of the invention, the ZSM-5 additive is a phosphorus stabilized ZSM-5 additive such as disclosed in U.S. Pat. No. 6,916,757, the disclosure of which is being herein incorporated by reference. Preferably, the ZSM-5 light olefins additive is used in an amount ranging from about 0.2 wt % to about 30 wt % of the catalyst composition.

The particle size and attrition properties of the invention catalyst affect fluidization properties in the catalytic cracking unit and determine how well the catalyst is retained in the commercial unit, especially in an FCC unit. The catalyst composition of the invention typically has a mean particle size of about 20 μm to about 150 μm, more preferably from about 50 μm to about 100 μm. The attrition properties of the invention catalyst, as measured by the Davison Attrition Index (DI) typically have a DI value of less that 20, more preferably less than 10 and most preferably less than 8.

Generally, catalyst compositions in accordance with the present invention may be prepared by forming an aqueous slurry which comprises 30 to 50 parts by weight of yttrium/rare earth exchanged zeolite cracking component, and optionally, from about 0 to about 70 wt % of clay, matrix and binder materials. The aqueous slurry is milled to obtain a homogeneous or substantially homogeneous slurry. Alternatively, the components forming the slurry are milled prior to forming the slurry. The slurry is thereafter mixed to obtain a homogeneous or substantially homogeneous aqueous slurry.

The aqueous slurry is thereafter subjected to a spray drying step using conventional spray drying techniques. In a preferred embodiment the slurry is spray dried at a spray dryer inlet temperature ranging from about 220° C. to about 370° C. and a spray dryer outlet temperature ranging from about 135° C. to about 180° C. The spray dried catalyst may be used as a finished catalyst "as is", or it can be calcined prior to use. When calcined, the catalyst particles are calcined at temperatures ranging from about 250° C. to about 800° C. for a period of about 4 hours to about 10 seconds. Preferably, the catalyst particles are calcined at a temperature ranging from about 350° C. to 600° C. for about 2 hours to 10 seconds.

Yttrium/rare earth containing cracking catalyst compositions of the invention are especially useful in an FCC processes to provide increased yields of light olefins as compared to conventional cracking catalyst compositions based on a lanthanum exchanged zeolite catalytic cracking active component. Increased yields of light olefins up to about 15%, preferably ranging from about 0.7 to about 12%, are obtainable using the invention catalyst as compared to FCC catalyst compositions based on lanthanum exchanged Y-type zeolite. Yttrium/rare earth catalyst compositions of the invention advantageously increase the yields of light olefins simultaneously with an increase in the yields of gasoline olefins thereby increasing the octane number of gasoline products obtained. In addition, increase bottoms conversion is obtained during an FCC process using the yttrium/rare earth containing catalyst compositions of the invention.

For purposes of this invention, the phrase "catalytic cracking conditions" is used herein to indicate the conditions of a typical catalytic cracking process, which is almost invariably an FCC process, wherein a circulating inventory of catalytic cracking catalyst is contacted with a heavy hydrocarbon feedstock at elevated temperature to convert the feedstocks into lower molecular weight compounds.

The term "catalytic cracking activity" is used herein to indicate the ability of a zeolite to catalyze the conversion of hydrocarbons to lower molecular weight compounds under catalytic cracking conditions, in particularly under fluid catalytic cracking conditions.

Cracking catalyst compositions of the invention are especially useful in conventional FCC processes or other catalytic cracking processes where hydrocarbon feedstocks are cracked into lower molecular weight compounds. Somewhat briefly, FCC conditions involves the cracking of heavy hydrocarbon feedstocks to form lower molecular weight hydrocarbon components by contact of the feedstock at elevated temperature in a cyclic catalyst recirculation cracking process with a circulating fluidizable catalytic cracking catalyst inventory consisting of particles having a size ranging from about 20 μm to about 150 μm, preferably from about 50 μm to about 100 μm. The catalytic cracking of these relatively high molecular weight hydrocarbon feedstocks result in the production of a hydrocarbon product of lower molecular weight. The significant steps in the cyclic FCC process are:
 (i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form gas and liquid cracking products including gasoline;

(iv) the spent catalyst is stripped, usually with steam, to remove occluded hydrocarbons from the catalyst, after which the stripped catalyst is regenerated in a catalyst regeneration zone to produce hot, regenerated catalyst, which is then recycled to the cracking zone for cracking further quantities of feed.

Typical FCC processes are conducted at reaction temperatures of about 480° C. to about 570° C., preferably from about 520° C. to about 550° C. Reactor effluent, comprising hydrocarbon vapors and cracking catalyst containing carbonaceous material or coke, are transferred to a separations zone where the spent cracking catalyst is removed from the hydrocarbon vapors, and is stripped in a stripping zone before regeneration. The stripping zone can be suitably maintained at a temperature in the range from about 470° C. to about 560° C., preferably from about 510° C. to about 540° C.

The regeneration zone temperatures will vary depending on the particular FCC unit. As it is well known in the art, the catalyst regeneration zone may consist of a single or multiple reactor vessels. Generally, the regeneration zone temperature ranges from about 650° C. to about 760° C., preferably from about 700° C. to about 730° C.

Cracking catalyst compositions of the invention may be added to the circulating FCC catalyst inventory while the cracking process is underway or they may be present in the inventory at the start-up of the FCC operation. As will be understood by one skilled in the art, the catalyst particles may alternatively be added directly to the cracking zone, to the regeneration zone of the FCC cracking apparatus, or at any other suitable point in the FCC process.

It is also within the scope of the invention to use the cracking catalyst compositions of the invention alone or in combination with other conventional FCC catalysts including, for example, zeolite based catalysts with a faujasite cracking component as described in the seminal review by Venuto and Habib, *Fluid Catalytic Cracking with Zeolite Catalysts*, Marcel Dekker, New York 1979, ISBN 0-8247-6870-1 as well as in numerous other sources such as Sadeghbeigi, *Fluid Catalytic Cracking Handbook*, Gulf Publ. Co. Houston, 1995, ISBN 0-88415-290-1. Typically, the FCC catalysts consist of a binder, usually silica, alumina, or silica alumina, a Y type zeolite acid site active component, one or more matrix aluminas and/or silica aluminas, and clays, such as kaolin clay.

The yttrium/rare earth catalyst of the invention may be used to crack any typical hydrocarbon feedstocks, including but not limited to, hydrotreated feeds, vacuum gas oil (VGO), resid, atmospheric tower bottoms, coker gas oil, combinations thereof, and the like.

To further illustrate the present invention and the advantages thereof, the following specific examples are given. The examples are given as specific illustrations of the claimed invention. It should be understood, however, that the invention is not limited to the specific details set forth in the examples.

All parts and percentages in the examples as well as the remainder of the specification that refers to solid compositions or concentrations are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

"CPS" is used herein to indicate a cyclic propylene steam deactivation procedure which uses propylene and air to simulate the REDOX process in addition to the steaming deactivation effect. (See American Chemical Society Symposium Series, No. 634, Page 171-183(1996).

"ACE" is used herein to mean the Advanced Cracking Evaluation Test as described in U.S. Pat. No. 6,069,012, said reference being herein incorporated by reference.

The surface area as indicated herein was measured by $N_2$ BET method and chemical analysis was performed by ICP analysis, standardized to National Institute of Science and Technology standards.

"DCR" is used herein to designate the Davison Circulating Riser. The description of the DCR has been published in the following papers: G. W. Young, G. D. Weatherbee, and S. W. Davey, "Simulating Commercial FCCU Yields with the Davison Circulating Riser Pilot Plant Unit," National Petroleum Refiners Association (NPRA) Paper AM88-52; G. W. Young, "Realistic Assessment of FCC Catalyst Performance in the Laboratory," in Fluid Catalytic Cracking: Science and Technology, J. S. Magee and M. M. Mitchell, Jr. Eds., Studies in Surface Science and Catalysis Volume 76, p. 257, Elsevier Science Publishers B.V., Amsterdam 1993, ISBN 0-444-89037-8.

Example 1

A base catalyst, Catalyst A, was prepared as follows: Aqueous solutions of 6954 grams (1919 g on a dry base) of the low soda USY, 3478 grams (800 g on a dry base) aluminum chlorohydrol, 947 grams (500 g on a dry base) alumina, and 2118 grams (1800 g on a dry base) clay, and 370 grams (100 g on a dry base) lanthanum solution were added in the order of the above and was mixed for about 10 minutes to form an aqueous slurry. The slurry was milled in a Drais mill to reduce particle size and spray dried in a Bowen Spray dryer at an inlet temperature of 343° C. The spray dried particles were calcined for 1 hour at 1100 ° F. (593° C.). The chemical and physical properties of the catalyst are shown in Table 1 below.

Example 2

A catalyst in accordance with the invention, Catalyst B, was prepared as follows: Aqueous solutions of 6954 grams (1919 g on a dry base) of the low soda USY, 3478 grams (800 g on a dry base) aluminum chlorohydrol, 947 grams (500 g on a dry base) alumina, and 2118 grams (1800 g on a dry base) clay, and 77 grams (17.6 g on a dry base) yttrium concentrated solution were added in the order of the above and mixed for about 10 minutes to form an aqueous slurry. The slurry was milled in a Drais mill to reduce particle size and spray dried in a Bowen Spray dryer at an inlet temperature of 343° C. The spray dried particles were calcined for 1 hour at 1100° F. (593° C.). The chemical and physical properties of the catalyst are shown in Table 1 below.

Example 3

A catalyst in accordance with the invention, Catalyst C, was prepared as follows: Aqueous solutions of 5856 grams (1616 g on a dry base) of the low soda USY, 3043 grams (700 g on a dry base) aluminum chlorohydrol, 947 grams (500 g on a dry base) alumina, and 2588 grams (2200 g on a dry base) clay, and 77 grams (17.6 g on a dry base) yttrium concentrated solution were added in the order of the above and mixed for about 10 minutes to form an aqueous slurry. The slurry was milled in a Drais mill to reduce particle size and spray dried in a Bowen Spray dryer at an inlet temperature of 343° C. The spray dried particles were calcined for 1 hour at 1100° F. (593° C.). The chemical and physical properties of the catalyst are shown in Table 1 below.

TABLE 1

| Description | Catalyst A | Catalyst B | Catalyst C |
|---|---|---|---|
| Yttrium/Z*, wt % | | 0.92 | 1.09 |
| Yttrium/Rare Earth Ratio** | | 3.5 | 3.7 |
| $Al_2O_3$, %: | 43.5 | 42.4 | 43.1 |
| $Na_2O$, %: | 0.39 | 0.37 | 0.36 |
| REO (Oxides of Rare Earths), %: | 1.99 | 0.11 | 0.10 |
| $La_2O_3$, %: | 1.88 | 0.09 | 0.08 |
| $Y_2O_3$, %: | 0.00 | 0.39 | 0.37 |
| Pore Volume, $cm^3/g$: | 0.44 | 0.45 | 0.44 |
| Surface Area ($m^2/g$)—SA | 333 | 342 | 301 |
| Zeolite Surface Area ($m^2/g$)—ZSA | 276 | 281 | 242 |
| Matrix Surface Area ($m^2/g$)—MSA | 57 | 61 | 59 |

*Yttrium/Z is defined as wt % Y2O3/Zeolite Input
**Yttrium/Rare Earth Ratio is defined as wt % Y2O3/wt % ReO

Example 4

Catalysts A, B and C were evaluated for the ability to increase light olefins during an FCC process. The catalysts were deactivated for 20 hours at 1450° F. (788° C.) using CPS. Following deactivation, the catalysts were tested using ACE.

For the purpose of the evaluation, a commercial FCC feed was used as described in Table 2 below.

TABLE 2

| Feed Properties | |
|---|---|
| Aniline Point | 196 |
| API Gravity @60° F. | 25.5 |
| Sulfur wt % | 0.369 |
| Total Nitrogen wt % | 0.12 |
| Basic Nitrogen wt % | 0.05 |
| Conradson Carbon wt % | 0.68 |
| K Factor | 11.94 |
| Specific Gravity @60° F. | 0.901 |
| Refractive Index | 1.503 |
| Average Molecular Weight | 406 |
| Aromatic Ring Carbons, Ca wt % | 18.9 |
| Naphthenic, Cn wt % | 17.4 |
| Paraffinic Carbons, Cp wt % | 63.6 |
| Distillation, Initial Boiling Point, ° F. | |
| IBP | 307 |
| Feed 5% | 513 |
| Feed 10% | 607 |
| Feed 20% | 691 |
| Feed 30% | 740 |
| Feed 40% | 782 |
| Feed 50% | 818 |
| Feed 60% | 859 |
| Feed 70% | 904 |
| Feed 80% | 959 |
| Feed 90% | 1034 |
| Feed 95% | 1103 |
| FBP | 1257 |

Results are recorded in Table 3 below.

TABLE 3

| | Conversion 74 | | |
|---|---|---|---|
| Description | Catalyst A | Catalyst B | Catalyst C |
| Catalyst to Oil Ratio | 7.4 | 7.2 | 7.2 |
| Hydrogen | 0.05 | 0.05 | 0.06 |
| Ethylene | 0.5 | 0.6 | 0.5 |
| Propylene | 4.7 | 5.1 | 4.9 |
| Total C3's | 5.4 | 5.8 | 5.7 |
| Total C4 = s | 6.5 | 7.2 | 7.1 |
| IsoButane | 4.0 | 4.1 | 3.9 |
| Total C4s | 11.5 | 12.2 | 11.9 |
| Gasoline | 53.0 | 51.7 | 52.3 |
| LCO | 19.7 | 20.0 | 20.1 |
| Bottoms | 6.3 | 6.0 | 5.9 |
| Coke | 2.6 | 2.7 | 2.5 |
| Paraffins | 36.8 | 35.1 | 34.7 |
| IsoParaffins | 32.9 | 31.4 | 30.9 |
| Olefins | 23.4 | 25.6 | 26.0 |
| Naphthenes | 10.5 | 10.0 | 10.3 |
| Aromatics | 29.3 | 29.3 | 29.1 |
| RON* | 90.6 | 91.5 | 91.4 |
| MON** | 79.7 | 80.1 | 80.0 |

*RON: research octane number
**MON: motor octane number

Table 3 shows that yttrium/rare earth containing catalysts in accordance with the invention, Catalysts B and C, produced increased amounts of $C_3$ and $C_4$ light olefins and gasoline olefins as compared to the lanthanum containing base catalyst, Catalyst A.

Example 5

A base catalyst, Catalyst D, was prepared as follows: Aqueous solutions of 8418 grams (2323 g on a dry base) of the low soda USY, 3696 grams (850 g on a dry base) aluminum chlorohydrol, 379 grams (200 g on a dry base) alumina, and 1941 grams (1650 g on a dry base) clay, and 222 grams (60 g on a dry base) lanthanum solution were added in the order of the above and mixed for about 10 minutes to form an aqueous slurry. The slurry was milled in a Drais mill to reduce particle size and spray dried in a Bowen Spray dryer at an inlet temperature of 343° C. The spray dried particles were calcined for 1 hour at 1100° F. (593° C.). The chemical and physical properties of the catalyst are shown in Table 4 below.

Example 6

A catalyst, Catalyst E, in accordance with the present invention was prepared as follows: 8418 grams (2323 g on a dry base) of the low soda USY, 3696 grams (850 g on a dry base) aluminum chlorohydrol, 379 grams (200 g on a dry base) alumina, and 1941 grams (1650 g on a dry base) clay, and 92 grams (21.0 g on a dry base) yttrium concentrated solution were added in the order of the above and mixed for about 10 minutes to form an aqueous slurry. The slurry was milled in a Drais mill to reduce particle size and spray dried in a Bowen Spray dryer at an inlet temperature of 343° C. The spray dried particles were calcined for 1 hour at 1100° F. (593° C.). Chemical and physical properties of the catalyst are recorded in Table 4 below.

Example 7

A catalyst, Catalyst F, in accordance with the present invention was prepared as follows: Aqueous solutions of 8418 grams (2323 g on a dry base) of the low soda USY, 3696 grams (850 g on a dry base) aluminum chlorohydrol, 379 grams (200 g on a dry base) alumina, and 1941 grams (1650 g on a dry base) clay, and 46 grams (10.5 g on a dry base) yttrium concentrated solution were added in the order of the above and mixed for about 10 minutes to form an aqueous slurry. The slurry was milled in a Drais mill to reduce particle size and spray dried in a Bowen Spray dryer at an inlet temperature of 343° C. The spray dried particles were calcined for 1 hour at 1100° F. (593° C.). Chemical and physical properties of the catalyst are recorded in Table 4 below.

TABLE 4

| Description: | Catalyst E | Catalyst F | Catalyst D |
|---|---|---|---|
| Yttrium/Z*, wt % | 0.91 | 0.46 | — |
| Yttrium/Rare Earth Ratio** | 9.0 | 5.0 | — |
| $Al_2O_3$, %: | 43.76 | 43.69 | 42.71 |
| $Na_2O$, %: | 0.50 | 0.51 | 0.46 |
| ReO (Oxides of the Rare Earth), %: | 0.05 | 0.05 | 1.20 |
| $La_2O_3$, %: | 0.05 | 0.05 | 1.14 |
| $Y_2O_3$, %: | 0.45 | 0.25 | 0.01 |
| Pore Volume, $cm^3/g$: | 0.48 | 0.48 | 0.48 |
| Surface Area ($m^2/g$)—SA | 373 | 368 | 378 |
| Zeolite Surface Area ($m^2/g$)—ZSA | 321 | 315 | 325 |
| Matrix Surface Area ($m^2/g$)—MSA | 52 | 53 | 53 |

*Yttrium/Z is defined as wt % Y2O3/Zeolite Input
**Yttrium/Rare Earth Ratio is defined as wt % Y2O3/wt % ReO

Example 8

Catalysts E, F and D were evaluated for the ability to increase light olefins during an FCC process. The catalysts were deactivated for 20 hours at 1450° F. (788° C.) using CPS. Following deactivation, the catalysts were tested in the DCR.

For the purpose of the evaluation, the commercial FCC feed was used as described in Table 2.

Results are recorded in Table 5 below.

TABLE 5

| | Conversion 71 | | |
|---|---|---|---|
| Description: | Catalyst E | Catalyst F | Catalyst D |
| Cat to Oil | 5.4 | 6.6 | 5.5 |
| H2 Yield wt % | 0.03 | 0.03 | 0.03 |
| C2 = wt % | 0.7 | 0.6 | 0.6 |
| Total C3 wt % | 4.8 | 4.8 | 4.7 |
| C3 = wt % | 4.2 | 4.1 | 4.1 |
| Total C4 wt % | 9.1 | 9.3 | 9.0 |
| Total C4 = wt % | 6.9 | 7.0 | 6.7 |
| Gasoline wt % | 53.1 | 52.8 | 53.0 |
| Paraffins | 3.1 | 3.2 | 3.2 |
| IsoParaffins | 19.4 | 19.6 | 20.0 |
| Aromatics | 26.4 | 25.6 | 26.1 |
| Naphthenes | 11.9 | 11.8 | 12.1 |

TABLE 5-continued

| | Conversion 71 | | |
|---|---|---|---|
| Description: | Catalyst E | Catalyst F | Catalyst D |
| Olefins | 39.6 | 39.8 | 38.7 |
| G-Con RON* EST | 92.8 | 92.7 | 92.5 |
| G-Con MON**EST | 79.0 | 79.0 | 78.9 |
| LCO wt % | 20.2 | 20.0 | 20.1 |
| Bottoms wt % | 8.7 | 8.8 | 8.8 |
| Coke wt % | 2.1 | 2.2 | 2.1 |

*RON: research octane number
**MON: motor octane number

Table 5 shows that yttrium/rare containing catalysts in accordance with the invention, Catalysts E and F, produced increased amounts of $C_3$ and $C_4$ light olefins and gasoline olefins as compared to the lanthanum containing base catalyst, Catalyst D.

Example 9

A catalyst, Comparative Catalyst G, was prepared as follows: Aqueous solutions of 7869 grams (2171 g on a dry base) of the low soda USY, 3696 grams (850 g on a dry base) aluminum chlorohydrol, and 2352 grams (1999 g on a dry base) clay, and 35 grams (8.0 g on a dry base) of pure yttrium solution were added in the order of the above and mixed for about 10 minutes to form an aqueous solution. The slurry was milled in a Drais mill to reduce particle size and spray dried in a Bowen Spray dryer at an inlet temperature of 343° C. The spray dried particles were calcined for 1 hour at 1100° F. (593° C.). Chemical and physical properties of the catalyst are recorded in Table 6 below.

Example 10

A catalyst, Catalyst H, was prepared as follows: 7869 grams (2171 g on a dry base) of the low soda USY, 3696 grams (850 g on a dry base) aluminum chlorohydrol, and 2352 grams (1999 g on a dry base) clay, and 35 grams (8.0 g on a dry base) yttrium concentrated solution were added in the order of the above and mixed for about 10 minutes to form an aqueous slurry. The slurry was milled in a Drais mill to reduce particle size and spray dried in a Bowen Spray dryer at an inlet temperature of 343° C. The spray dried particles were calcined for 1 hour at 1100° F. (593° C.). Chemical and physical properties of the catalyst are recorded in Table 6 below.

TABLE 6

| Description: | Catalyst G Comparative | Catalyst H |
|---|---|---|
| Yttrium/Z*, % | | 0.49 |
| Yttrium/Rare Earth Ratio** | | 4.2 |
| $Al_2O_3$, %: | 42.70 | 43.62 |
| $Na_2O$, %: | 0.39 | 0.46 |
| ReO (Oxides of Rare Earth), %: | 0.02 | 0.05 |
| $La_2O_3$, %: | 0.02 | 0.05 |
| $Y_2O_3$, %: | 0.18 | 0.21 |
| Pore Volume, $cm^3/g$: | 0.46 | 0.47 |
| Surface Area ($m^2/g$)—SA | 347 | 344 |
| Zeolite Surface Area ($m^2/g$)—ZSA | 284 | 285 |
| Matrix Surface Area ($m^2/g$)—MSA | 63 | 59 |

*Yttrium/Z is defined as wt % Y2O3/Zeolite Input
**Yttrium/Rare Earth Ratio is defined as wt % Y2O3/wt % ReO

Example 11

Comparative Catalyst G as prepared in Example 9 and Catalyst H as prepared in Example 10 were evaluated for the ability to increase light olefins during an FCC process. The catalysts were deactivated for 20 hours at 1465° F. (796° C.) using CPS. Following deactivation, the catalysts were tested using ACE.

For the purpose of the evaluation, a commercial FCC feed was used as described in Table 2 above.

Results are recorded in Table 7 below.

TABLE 7

Conversion 70

|  | Catalyst G (Comparative, Pure Yttrium) | Catalyst H (Yttrium Plus Rare Earth) |
|---|---|---|
| Catalyst to Oil Ratio | 6.3 | 6.4 |
| Hydrogen | 0.05 | 0.04 |
| Ethylene | 0.5 | 0.5 |
| Propylene | 4.5 | 4.6 |
| Total C3's | 5.2 | 5.2 |
| Total C4 = s | 6.6 | 6.9 |
| IsoButane | 3.3 | 3.2 |
| Total C4s | 10.8 | 10.8 |
| Gasoline | 50.2 | 50.6 |
| LCO | 22.1 | 22.2 |
| Bottoms | 7.9 | 7.8 |
| Coke | 2.4 | 2.4 |
| Paraffins | 31.7 | 30.6 |
| IsoParaffins | 28.0 | 27.0 |
| Olefins | 27.3 | 29.5 |
| Naphthenes | 11.5 | 11.4 |
| Aromatics | 29.1 | 28.1 |
| RON* | 91.5 | 91.8 |
| MON** | 79.6 | 79.6 |

*RON: research octane number
**MON: motor octane number

Table 7 shows that the yttrium/rare earth catalyst in accordance with the invention, Catalyst H, produced increased amounts of $C_3$ and $C_4$ light olefins and gasoline olefins as compared to Comparative Catalyst G which contained no rare earth but yttrium only.

Example 12

Comparative Catalyst G as prepared in Example 8 was blended with 4 wt % of OlefinsUltra®, a commercial ZSM-5 containing olefins additive manufactured and sold by Grace Davison, a division of W. R. Grace & Co.-Conn. in Columbia, Md.

Example 13

Catalyst H as prepared in Example 9 was blended with 4 wt % of OlefinsUltra®, a commercial ZSM-5 containing olefins additive, manufactured and sold by Grace Davison, a division of W. R. Grace & Co.-Conn. in Columbia, Md.

Example 14

Catalyst blends as prepared in Examples 12 and Example 13 were evaluated for the ability to increase light olefins during an FCC process. The blends were deactivated for 20 hours at 1465° F. (788° C.) using CPS. Following deactivation, the catalysts were tested using ACE.

For the purpose of the evaluation, a commercial FCC feed was used as described in Table 2 above.

Results are recorded in Table 8 below.

TABLE 8

Conversion 70

|  | Catalyst G (Pure Yttrium) + ZSM-5 | Catalyst H + ZSM-5 |
|---|---|---|
| Catalyst to Oil Ratio | 5.6 | 6.0 |
| Hydrogen | 0.04 | 0.04 |
| Ethylene | 0.8 | 0.8 |
| Propylene | 8.7 | 9.3 |
| Total C3's | 9.7 | 10.2 |
| Total C4 = s | 8.8 | 9.6 |
| IsoButane | 4.3 | 4.0 |
| Total C4s | 14.1 | 14.5 |
| Gasoline | 42.6 | 41.5 |
| LCO | 21.8 | 22.1 |
| Bottoms | 8.2 | 7.9 |
| Coke | 2.3 | 2.3 |
| Paraffins | 28.7 | 27.5 |
| IsoParaffins | 25.2 | 24.0 |
| Olefins | 28.4 | 30.5 |
| Naphthenes | 10.5 | 10.3 |
| Aromatics | 31.8 | 31.2 |
| RON* | 93.4 | 93.6 |
| MON** | 80.8 | 80.7 |

*RON: research octane number
**MON: motor octane number

Table 8 shows that the use of a yttrium/rare catalyst in accordance in combination with a ZSM-5 light olefins additive produced increased amounts of $C_3$ and $C_4$ light olefins and gasoline olefins as compared to the combination of the ZSM-5 additive with Comparative Catalyst G containing only yttrium.

Example 15

Comparative Catalyst I was prepared as follows: Aqueous solutions of 6954 grams (1919 g on a dry base) of the low soda USY, 3478 grams (800 g on a dry base) aluminum chlorohydrol, 947 grams (500 g on a dry base) alumina, and 2118 grams (1800 g on a dry base) clay, and 307 grams (70.0 g on a dry base) yttrium concentrated solution were added in the order of the above and mixed for about 10 minutes to form an aqueous slurry. The slurry was milled in a Drais mill to reduce particle size and spray dried in a Bowen Spray dryer at an inlet temperature of 343° C. The spray dried particles were calcined for 1 hour at 1100° F. (593° C.). Chemical and physical properties of the catalyst are recorded in Table 9 below.

TABLE 9

| Description | Catalyst I (Comparative) |
|---|---|
| Yttrium/Z*, wt % | 3.68 |
| Yttrium/ReO Ratio** | 5.8 |
| $Al_2O_3$, %: | 43.77 |
| $Na_2O$, %: | 0.36 |
| REO(Oxides of the Rare Earth), %: | 0.23 |
| $La_2O_3$, %: | 0.20 |
| $Y_2O_3$, %: | 1.33 |
| Pore Volume, $cm^3/g$: | 0.45 |
| Surface Area ($m^2/g$)—SA | 338 |
| Zeolite Surface Area ($m^2/g$)—ZSA | 282 |
| Matrix Surface Area ($m^2/g$)—MSA | 56 |

*Yttrium/Z is defined as wt % Y2O3/Zeolite Input
**Yttrium/REO Ratio is defined as wt % Y2O3/wt % REO Example 16

Base Catalyst A as prepared in Example 1, Comparative Catalyst I as prepared in Example 15 and Catalyst B prepared in Example 2 were evaluated for the ability to increase light olefins during an FCC process. The catalysts were deactivated for 20 hours at 1450° F. (788° C.) using CPS. Following deactivation, the catalysts were tested using ACE.

For the purpose of the evaluation, a commercial FCC feed was used as described in Table 2 above.

Results are recorded in Table 10 below.

TABLE 10

Conversion 74

| Description | Catalyst A | Catalyst I Comparative | Catalyst B |
|---|---|---|---|
| Catalyst to Oil Ratio | 7.4 | 4.7 | 7.2 |
| Hydrogen | 0.05 | 0.04 | 0.05 |
| Ethylene | 0.5 | 0.5 | 0.6 |
| Propylene | 4.7 | 4.6 | 5.1 |
| Total C3's | 5.4 | 5.4 | 5.8 |
| Total C4 = s | 6.5 | 6.0 | 7.2 |
| IsoButane | 4.0 | 4.5 | 4.1 |
| Total C4s | 11.5 | 11.6 | 12.2 |
| Gasoline | 53.0 | 52.8 | 51.7 |
| LCO | 19.7 | 19.5 | 20.0 |
| Bottoms | 6.3 | 6.5 | 6.0 |
| Coke | 2.6 | 2.7 | 2.7 |
| Paraffins | 36.8 | 39.2 | 35.1 |
| IsoParaffins | 32.9 | 35.2 | 31.4 |
| Olefins | 23.4 | 19.5 | 25.6 |
| Naphthenes | 10.5 | 11.0 | 10.0 |
| Aromatics | 29.3 | 30.4 | 29.3 |
| RON* | 90.6 | 89.9 | 91.5 |
| MON** | 79.7 | 79.7 | 80.1 |

*RON: research octane number
**MON: motor octane number

Table 10 shows that Comparative Catalyst I having a yttrium concentration of greater than 1.75 wt % produced less $C_3$, $C_4$, and gasoline olefins as compared to an invention catalyst, Catalyst B, having a yttrium concentration between about 1.75 wt % and about 0.175 wt % of the zeolite.

What is claimed is:

1. A catalyst composition for catalytically cracking hydrocarbons to maximize light olefins production, which composition comprises a zeolite having catalytic cracking activity under catalytic cracking conditions, said zeolite being exchanged with yttrium and at least one rare earth metal, wherein the amount of yttrium exchanged on the zeolite ranges from about 1.75 wt % to about 0.175 wt % of the zeolite, and the ratio of yttrium to rare earth metal exchanged on the zeolite ranges from about 3 to about 50.

2. The catalyst of claim 1 wherein the zeolite is a faujasite zeolite.

3. The catalyst of claim 2 wherein the zeolite is a Y-type zeolite.

4. The catalyst of claim 1 wherein the rare earth metal is a metal selected from group consisting of lanthanum, a metal of the Lanthanide Series of the Periodic Table having an atomic number from 58 to 71, and combinations thereof.

5. The catalyst of claim 1 wherein the amount of zeolite present in the catalyst ranges from about 10 wt % to about 60 wt % of the catalyst composition.

6. The catalyst of claim 5 wherein the amount of zeolite present in the catalyst ranges from about 20 wt % to about 50 wt % of the catalyst composition.

7. The catalyst of claim 1 wherein the ratio of yttrium to rare earth exchanged on the zeolite is 3.5 to 20.

8. The catalyst of claim 1 wherein the catalyst further comprises clay.

9. The catalyst of claim 1 wherein the catalyst further comprises at least one ZSM-5 light olefins additive.

10. The catalyst of claim 9 wherein the ZSM-5 light olefins additive comprises a phosphorus stabilized ZSM-5 additive.

11. A process of catalytically cracking a hydrocarbon feedstock into lower molecular weight components to maximize light olefins production, said method comprising contacting a hydrocarbon feedstock with a cracking catalyst at elevated temperature whereby lower molecular weight hydrocarbon components are formed, said cracking catalyst comprising a zeolite having catalytic cracking activity under catalytic cracking conditions, said zeolite being exchanged with yttrium and at least one rare earth metal, wherein the amount of yttrium exchanged on the zeolite ranges from about 1.75 wt % to about 0.175 wt % of the zeolite, and the ratio of yttrium to rare earth metal exchanged on the zeolite ranges from about 3 to about 50.

12. The process of claim 11 wherein the cracking catalyst further comprises faujasite zeolite.

13. The process of claim 12 wherein the zeolite is a Y type zeolite.

14. The process of claim 11 further comprising recovering the cracking catalyst from said contacting step and treating the used catalyst in a regeneration zone to regenerate said catalyst.

15. The process of claim 11 wherein the hydrocarbon feedstock is contacted with the cracking catalyst under fluid catalytic cracking conditions.

16. The process of claim 11 wherein the zeolite is a Y-type zeolite.

17. The process of claim 11 wherein the ratio of yttrium to rare earth exchanged on the zeolite is 3.5 to 20.

18. The process of claim 11 wherein the catalyst further comprises at least one ZSM-5 light olefins additive.

* * * * *